March 28, 1950 W. J. PASTORET 2,502,389
PORTABLE AIR HEATER
Filed Jan. 10, 1948 3 Sheets-Sheet 1

INVENTOR.
WALTER J. PASTORET
BY Paul, Paul + Moore
ATTORNEYS

March 28, 1950 W. J. PASTORET 2,502,389
PORTABLE AIR HEATER

Filed Jan. 10, 1948 3 Sheets-Sheet 2

INVENTOR.
WALTER J. PASTORET
BY Paul, Paul & Moore
ATTORNEYS

March 28, 1950  W. J. PASTORET  2,502,389
PORTABLE AIR HEATER

Filed Jan. 10, 1948  3 Sheets-Sheet 3

INVENTOR.
WALTER J. PASTORET
BY
Paul, Paul & Moore
ATTORNEYS

Patented Mar. 28, 1950

2,502,389

UNITED STATES PATENT OFFICE 2,502,389

PORTABLE AIR HEATER

Walter J. Pastoret, Savage, Minn., assignor of one-half to Harry C. Scribner, Minneapolis, Minn.

Application January 10, 1948, Serial No. 1,548

4 Claims. (Cl. 126—96)

This invention relates to new and useful improvements in portable heaters and more particularly to such heaters adapted for keeping warm the engines of automobiles, trucks, and airplanes, when stored in unheated garages or parked in the open in localities where the temperature is likely to drop below freezing, thereby to assure quick starting of the engine, even though the automotive vehicle may have been parked in the open for a long time in sub-zero weather.

There are now on the market several heaters of this general type, but to the best of my knowledge none of these have proven successful in the trade, primarily because of certain defects in the construction thereof. The novel heater forming the subject matter of the present invention is the result of considerable research and experimental work in an attempt to provide a heater of this class wherein all of the defects now inherent in such heaters have been eliminated, whereby a heater is provided which has adequate heating capacity to sufficiently heat the air within the hood of a conventional automobile or truck engine to keep the engine warm, even in sub-zero temperatures; and an object of the invention therefore is to provide a heater in which all of the defects now inherent in such heaters have been entirely eliminated, resulting in the provision of such a heater which embodies all of the desirable features required in such an apparatus to provide a safe, highly efficient heater which will withstand rough handling, and which may be utilized in many places where air within a confined space is to be heated.

A further object of the invention is to provide a portable liquid fuel burner which is very small and compact and is provided with means whereby it may readily be supported under the hood of an automobile or truck adjacent to the engine, thereby to warm the air around the engine to a temperature which will assure quick starting of the engine, even though the vehicle may have been parked in a sub-zero temperature for a long time.

A further object is to provide a burner of the class described which is extremely simple and inexpensive in construction and which is so constructed that it may be readily lighted with a minimum of effort and with the assurance that it will continue to burn so long as there is liquid fuel in the reservoir.

A further object is to provide a small portable liquid fuel heater comprising a fuel reservoir having a burner head secured to the top wall thereof and provided with means for detachably receiving and supporting an upright cylindrical casing, and a relatively larger outer casing member being fitted over said inner casing member with its wall spaced therefrom to provide an annular air circulating passage through which air to be heated may circulate in direct contact with the heated wall of the inner casing member.

A further object is to provide a heater of the class described which embodies a burner of simple well known construction, and the frame of which may readily be adjusted to suit conditions, and an air heating and circulating unit being supported on the burner head and comprising an annular air circulating chamber through which the air to be heated is upwardly circulated, said unit being readily removable from the burner to facilitate lighting and cleaning the burner.

A further object is to provide a small, inexpensive portable heater comprising a minimum of parts, which utilizes a readily obtainable commercial fuel oil, is safe and easy to operate, quickly generates a high heat, when started, whereby the air within a confined space such as the engine hood of an automobile or truck, may be quickly warmed or heated to a temperature which will assure quick starting of the engine in low temperatures, and the construction of the burner being such that it is not likely to become extinguished when exposed to strong drafts, once it has been lighted.

Other objects of the invention reside in the simple construction of the inner and outer cylindrical casings and in the means provided for securing said casing together in concentric relation and with the wall of the outer casing member spaced outwardly from the wall of the inner casing member to provide an annular air circulating passage through which the air to be heated is circulated; in the unique construction and arrangement of the carrying handle which is normally engaged with means on the outer casing member to retain the handle in upright operative position; in the provision of a portable burner of the class described which, in addition to serving as a heater, may also be utilized as a common lamp for lighting purposes by simply removing the air heating unit from the burner head and substituting therefor a conventional lamp chimney.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is an elevational view of my improved burner with the parts thereof in the positions assumed when the burner is in condition for use;

the arrows indicating the upward air circulation therethrough;

Figures 1, 3:
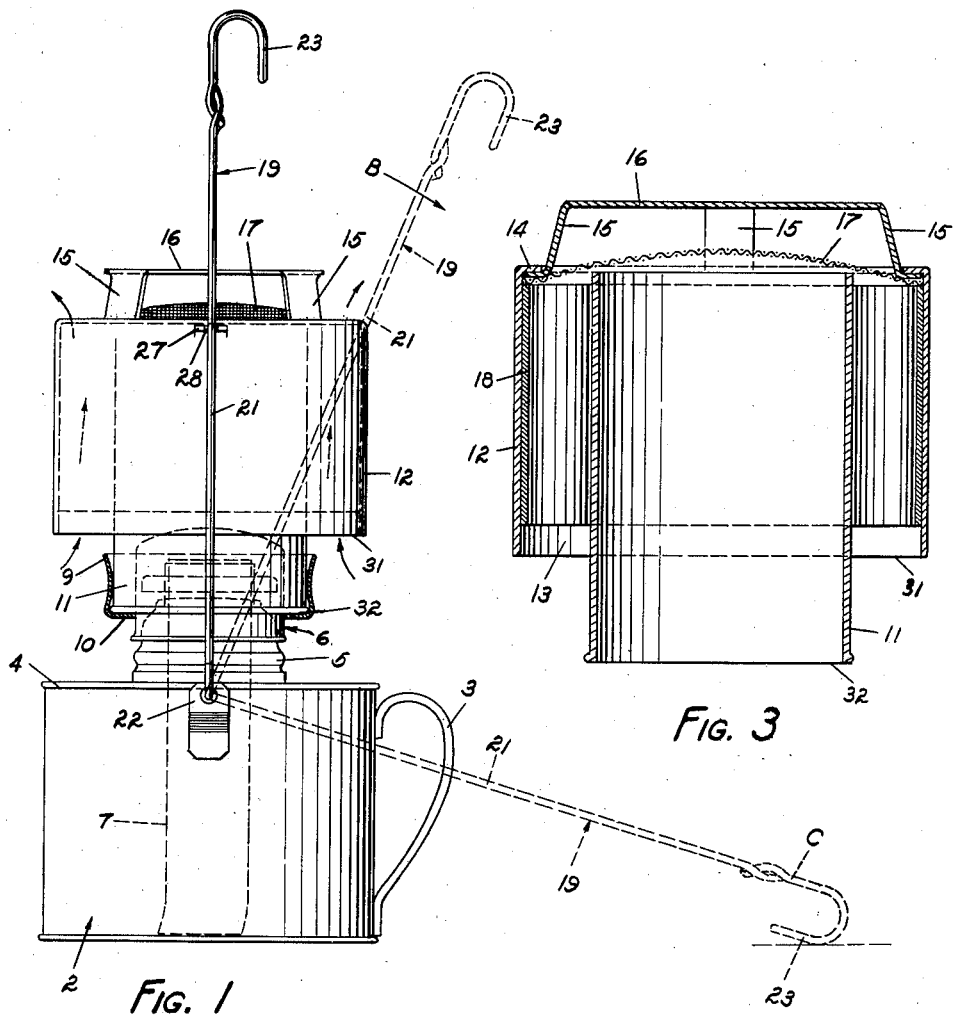
Figure 3 is a vertical sectional view of the casing assembly or air heating unit detached from the burner.

The novel burner herein disclosed is shown comprising a liquid fuel reservoir 2 which may be of any suitable shape and design, and which preferably is provided with a carrying handle 3, as best shown in Figure 1.

The top wall 4 of the reservoir is shown provided with an upstanding neck 5 to the upper end of which a suitable burner head, generally designated by the numeral 6, is detachably secured. The burner head may be detachably secured to the neck 5 by screw threads, or by other securing means which will permit the burner head to be readily moved from the neck 5 to permit introducing a liquid fuel into the reservoir 2.

The burner head 6 is shown provided with a suitable wick, indicated by the dotted lines 7 in Figure 1. The wick is vertically adjustable in the burner head by a well known form of adjusting element 8, shown in Figure 2.

The burner head is further provided with an annular upstanding flange 9 having an inwardly turned flange 10 at its bottom whose inner edge may be suitably secured to the burner head, as will be understood.

Figure 2:
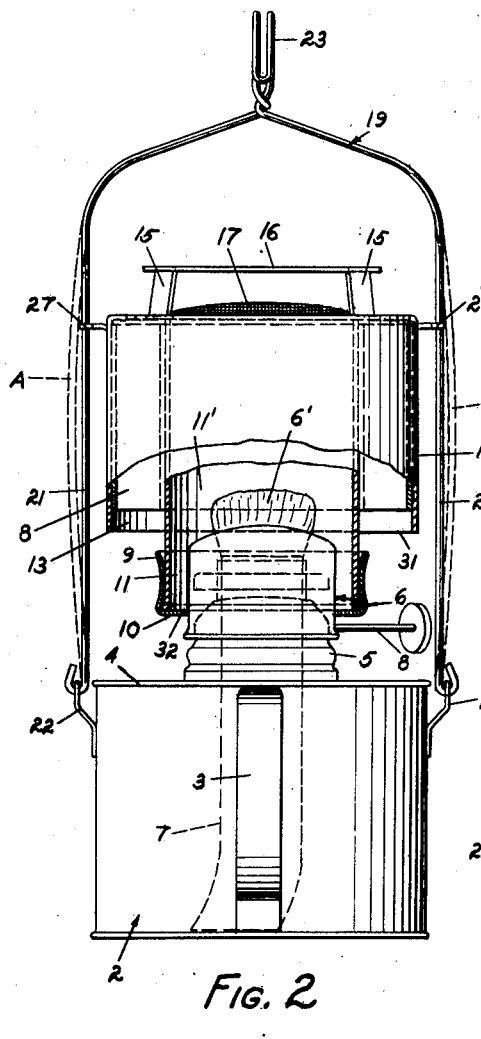
Figure 2 is a view similar to Figure 1 looking at the burner from another angle.

A cylindrical casing, which will hereinafter be referred to as the inner casing 11, has its lower end detachably fitting within the annular flange 9, as shown in Figures 1 and 2. The casing 11 extends upwardly from the burner head 6 and provides, in effect, a combustion chamber 11' for the burner flame 6' which is located in the lower portion of the casing 11, as shown in Figure 2. The burner 6, shown in the application drawings, may be of conventional design such as utilized in certain types of liquid fuel which are extremely simple and inexpensive in construction, and, when equipped with the flange 9, provides a very adequate support for the casing 11, and the parts carried thereby as will be understood by reference to Figure 3.

Encircling the inner casing member 11 is an outer casing 12. The wall 12 of the outer casing is spaced outwardly from the wall of the inner casing 11, thereby to provide an annular air circulating passage 13 through which the cold air to be heated may circulate, as indicated by the arrows in Figure 1, when the heater is operating.

The outer casing member 12 is shown provided at its upper end with an inwardly turned flange 14, against the lower face of which is seated the four legs 15 of a suitable deflecting plate 16 which is positioned directly over the inner casing member 11 in vertically spaced relation thereto.

Also shown secured to the flange 14 of the outer casing member is a suitable fine mesh screen 17 which serves to prevent sparks from being projected from the burner flame, and also to improve the efficiency of the burner by retarding air circulation upwardly through the casing members 11 and 12. The horizontal portion of the flange 9 is preferably provided with suitable air openings, not shown, through which air may be supplied to the combustion chamber 11' to supply oxygen for supporting proper combustion.

Figure 4:
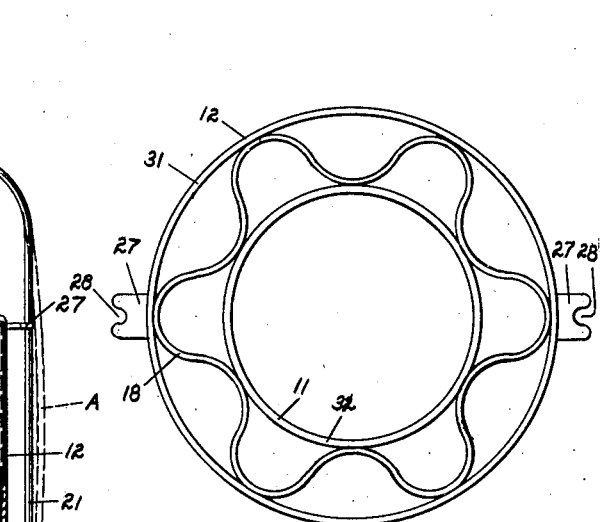
Figure 4 is a bottom view of Figure 3, showing the means provided for retaining the inner and outer casing members in concentric relation.
Figure 5:
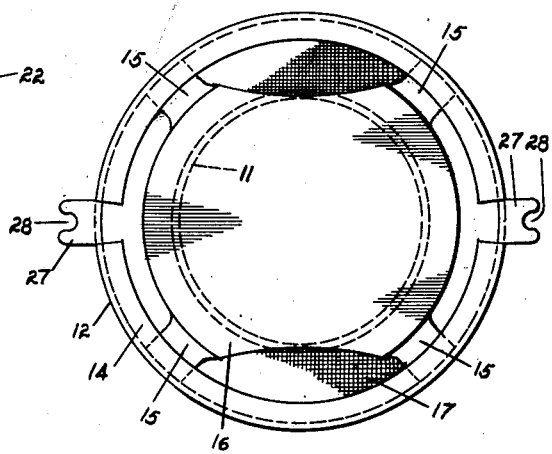
Figure 5 is a top view of Figure 3, showing the deflector plate positioned over the inner casing.

To retain the outer casing member 12 in concentric relation to the inner casing member 11, a spacing element, generally designated by the numeral 18, is shown inserted between the inner and outer casing members 11 and 12, respectively, as best shown in Figure 4. The spacing element 18 may be formed from strap or sheet metal which is corrugated to provide a series of undulations, as shown in Figure 4. The corrugations provided in the spacing member 18 are of such size as to engage the walls of both the inner and outer casing members 11 and 12, respectively, whereby the parts may be retained in concentric relation by friction, if desired. In practice, however, it may be found desirable to permanently secure the spacing element 18 between the inner and outer casing members whereby said casing members will be secured together to provide a structure which may readily be handled, when detached from the heater, as shown in Figure 3.

A suitable handle, generally designated by the numeral 19, is shown having its spaced legs 21 pivotally connected to suitable ears or lugs 22 provided on the wall of the fuel reservoir 2, as best shown in Figure 2. The handle 19 may be made from a single piece of wire formed with a hook element 23 at its upper end to facilitate suspending the heater from an overhead support, such as the brace rod 24, usually provided between the cowl 25 and radiator 26 of an automotive vehicle. See Figure 6.

Outwardly extending lugs 27 are shown provided on the outer casing member 12 having notches 28 therein for receiving the spaced legs 21 of the carrying handle 19, as clearly illustrated in Figures 1 and 2. The lugs 27 cooperate to retain the handle in its upright operative position, as illustrated in Figures 1 and 2.

When it is desired to remove the casing assembly or air heating unit from the burner head, as when lighting the burner, the legs 21 of the handle 19 may readily be slightly outwardly flexed, as indicated by the dotted lines A in Figure 2, after which the handle may be swung downwardly, as indicated by the arrow B in Figure 1, to an inoperative position shown at C.

Figure 6:
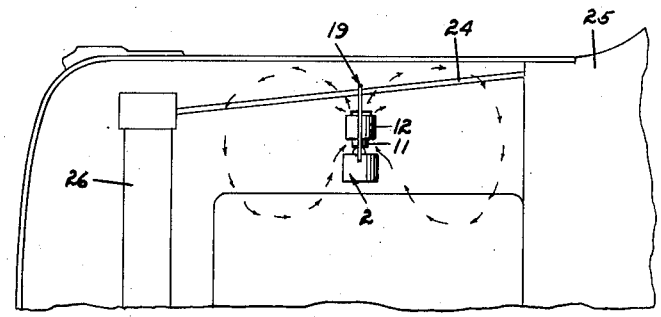
Figure 6 is a view showing the hood of an automotive vehicle with the novel burner herein disclosed, positioned over the vehicle engine to heat the air within the hood.
Figure 7:
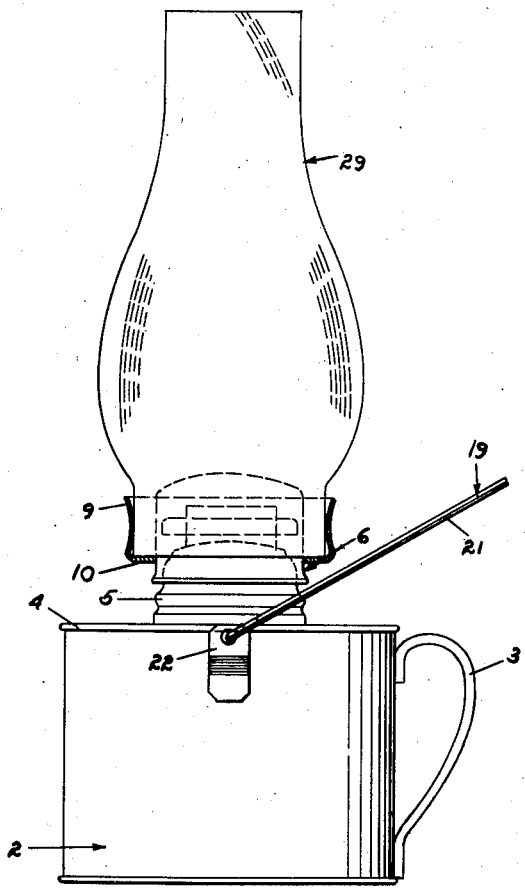
Figure 7 is a view showing the heater converted into a conventional form of lamp.

In Figure 7 a conventional lamp chimney 29 is shown substituted for the burner assembly, whereby the device may be utilized as a conventional liquid fuel lamp. It will thus be noted that the novel heater herein disclosed may be utilized as a heater, as shown in Figure 6, or as a lamp, for lighting purposes, as shown in Figure 7. When the heater is utilized as a heater for keeping an engine warm, it may be suspended from the truss or tie rod 24 directly over the engine, as shown in Figure 6, or it may be placed at a lower elevation adjacent to the carburetor. The flame 6' of the heater is so confined within the casing assembly as to substantially eliminate all fire hazards. The reservoir is also provided with a relatively large base whereby the heater may be safely positioned on any flat surface, as will be appreciated by reference to Figures 1 and 2.

The lower edge 31 of the outer casing is spaced upwardly from the lower edge 32 of the inner casing 11, as illustrated in Figures 1, 2 and 3, thereby to stimulate upward air circulation through the annular heating chamber 13 when the burner is in operation.

The heater is extremely simple to operate because of the simple construction of the casing assembly and the manner of supporting it on the burner head. The casing assembly is completely removable from the burner head as a unit, by simply disengaging the handle legs 21 from the lugs 27, after which the burner may be lighted by applying a lighted match to the burner wick 7. The casing assembly is then fitted onto the burner head and the legs 21 of the handle engaged with the lugs 27, whereupon the heater is ready for use. If the flame requires adjustment, such adjustment may readily be accomplished by manipulating the control element 8, shown in Figure 2.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In a heater of the class described, a liquid fuel reservoir, a burner head mounted on the reservoir and having means for supplying liquid fuel thereto from the reservoir, an inner casing supported on the burner and extending upwardly therefrom and providing a combustion chamber for the burner, a relatively larger casing fitting over the upper and central portions of the inner casing with its wall spaced from the wall of the inner casing to provide an annular air circulating passage between said casing walls through which air to be heated is circulated, the outer casing having an inwardly directed annular flange at its upper end, means secured to said flange and disposed over the top of the inner casing for outwardly directing a heated air discharging from the top of the outer casing, and a spacing element interposed in said annular air circulating passage for maintaining the inner and outer casing members in fixed concentric relation to one another.

2. In a heater of the class described, a liquid fuel reservoir, a burner head mounted on the reservoir, an air heating unit comprising an inner cylindrical imperforate casing having its lower end adapted to be supported on the burner head, said air heating unit comprising a relatively larger outer casing having its wall spaced outwardly from the wall of the inner casing to provide an annular upright air circulating passage open at its top and bottom, the lower edge of the outer casing being spaced upwardly from the lower edge of the inner casing to permit free and unrestricted air circulation upwardly through said annular passage, means positioned over the top of the inner casing member for eliminating sparks, and a handle having spaced legs pivotally connected to the reservoir and provided at its upper end with a hook adapted to be engaged with a suitable support for the heater, and means for retaining the handle in an upright operative position.

3. In a heater of the class described, a liquid fuel reservoir, a burner head mounted on the reservoir, an air heating unit comprising an inner casing member having its lower end adapted to be supported on the burner head, said air heating unit comprising a relatively larger outer cylindrical casing having its wall spaced outwardly from the wall of the inner casing to provide an annular upright air circulating passage open at its top and bottom, the lower edge of the outer casing being spaced upwardly from the lower edge of the inner casing to provide free unrestricted air circulation upwardly through said annular passage, a supporting member having spaced legs whose lower ends are pivotally connected to the reservoir, and outwardly directed notched lugs secured to the air heating unit adapted to receive the spaced legs of the supporting member, thereby to retain the supporting member in an upright operative position to facilitate suspending the heater from an overhead support.

4. In a heater of the class described, a liquid fuel reservoir, a burner head mounted on the reservoir and having means for supplying liquid fuel thereto from the reservoir, said burner having an upright annular flange, an inner cylindrical casing having its lower end fitting within said flange and whereby the casing is detachably supported on the burner, an outer casing fitting over the upper end portion of the inner casing with its wall outwardly spaced therefrom to provide an annular air heating passage through which air to be heated is circulated, an undulated spacing element interposed in the annular air circulating passage to retain the outer casing in concentric relation to the inner casing, a fine meshed screen secured to the upper end of the outer casing and overlying the top of the inner casing, notched lugs secured to the upper end of the outer casing, a supporting and carrying handle comprising spaced parallel legs having means at their lower ends for pivotally connecting them to the reservoir, said legs normally fitting within the recesses provided in said lugs whereby the handle may be retained in an upright operative position, means at the upper end of the handle, whereby the heater may readily be suspended from a support, and the legs of said handle being sufficiently flexible to permit them to be outwardly flexed, thereby to release them from the notched lugs in the upper end of the outer casing to thereby permit lowering the handle to an inoperative position.

WALTER J. PASTORET.

REFERENCES CITED

The following references are of record in the file of this patent:

UNITED STATES PATENTS

| Number | Name | Date |
|---|---|---|
| 428,043 | Danforth | May 13, 1890 |
| 481,511 | Randall | Aug. 23, 1892 |
| 634,674 | Slater | Oct. 10, 1899 |
| 740,530 | Clark | Oct. 6, 1903 |
| 978,990 | Damon | Dec. 20, 1910 |
| 1,146,555 | Conrath | July 13, 1915 |
| 2,019,646 | Barhoff | Nov. 5, 1935 |
| 2,271,076 | Hupfer | Jan. 27, 1942 |

FOREIGN PATENTS

| Number | Country | Date |
|---|---|---|
| 273,980 | Great Britain | July 14, 1927 |
| 346,841 | Great Britain | Apr. 20, 1931 |
| 452,255 | France | Mar. 3, 1913 |